United States Patent
Demircan et al.

(10) Patent No.: US 8,510,695 B1
(45) Date of Patent: Aug. 13, 2013

(54) TECHNIQUES FOR ELECTROMIGRATION STRESS DETERMINATION IN INTERCONNECTS OF AN INTEGRATED CIRCUIT

(75) Inventors: Ertugrul Demircan, Austin, TX (US); Mehul D. Shroff, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 13/484,328

(22) Filed: May 31, 2012

(51) Int. Cl.
  *G06F 17/50* (2006.01)
(52) U.S. Cl.
  USPC ............ 716/112; 716/110; 716/111; 716/115
(58) Field of Classification Search
  USPC .......................................... 716/110–112, 115
  See application file for complete search history.

(56) References Cited

U.S. PATENT DOCUMENTS

| | | | |
|---|---|---|---|
| 5,379,231 A * | 1/1995 | Pillage et al. | 703/14 |
| 6,789,237 B1 * | 9/2004 | Ismail | 716/113 |
| 7,318,207 B2 * | 1/2008 | Takabe | 716/115 |
| 7,451,411 B2 | 11/2008 | Hau-Riege et al. | |
| 2011/0173583 A1 | 7/2011 | Barwin et al. | |

OTHER PUBLICATIONS

Lienig, J, "Invited Talk: Introduction to Electromigration-Aware Physical Design", 2006, ACM 1-5593-299-2/06/0004. pp. 39-46.*

* cited by examiner

*Primary Examiner* — Stacy Whitmore
(74) *Attorney, Agent, or Firm* — Yudell Isidore Ng Russell PLLC (57) ABSTRACT

A technique for determining stress in interconnects of an integrated circuit design includes generating a maximal spanning tree of a directed graph. The directed graph represents an interconnect of an integrated circuit design. The technique also includes locating a first point on the spanning tree that has a lowest stress and a second point on the spanning tree that has a highest stress. The technique further includes determining whether a maximum first stress between the first and second points is less than a critical stress.

20 Claims, 5 Drawing Sheets

TECHNIQUES FOR ELECTROMIGRATION STRESS DETERMINATION IN INTERCONNECTS OF AN INTEGRATED CIRCUIT

BACKGROUND

1. Field

This disclosure relates generally to integrated circuits and, more specifically, techniques for electromigration stress determination in interconnects of an integrated circuit.

2. Related Art

Electromigration (EM) refers to the transport of material that is caused by gradual movement of ions in a conductor due to momentum transfer between conducting electrons and diffusing metal atoms. In general, EM should be considered in applications where relatively high direct current densities are expected, such as in microelectronics and related structures. As structure sizes in integrated circuits (ICs) decrease, the practical significance of EM increases. EM first became of practical interest when the first ICs became commercially available. EM research in the IC field began at a time when metal interconnects in ICs were about 10 micrometers wide. Currently, IC interconnects are hundreds to tens of nanometers in width. EM decreases the reliability of ICs (chips) and can cause the eventual loss of connections or failure of a circuit.

Although EM damage ultimately results in failure of an affected IC, initial symptoms may include intermittent glitches that are challenging to diagnose. As some interconnects fail before other interconnects, a circuit may exhibit random errors that are indistinguishable from other failure mechanisms. In a laboratory setting, EM failure may be readily viewed with an electron microscope, as interconnect erosion leaves visual markers on metal layers of an IC. With increasing IC miniaturization the probability of IC failure due to EM increases, as both power density and current density increase as IC size decreases. In advanced semiconductor manufacturing processes, copper has replaced aluminum as the interconnect material of choice, as copper is intrinsically less susceptible to EM. In modern consumer electronic devices, ICs rarely fail due to EM effects, because proper semiconductor design practices incorporate the effects of EM into the IC layouts. That is, nearly all IC design houses use automated electronic design automation (EDA) tools to detect and correct EM problems at the transistor layout-level.

In general, the "Blech length" has been used to denote a length limit for an interconnect below which EM will not occur at a given current density. That is, any interconnect whose length is below the "Blech length" will not typically fail due to EM at lower current densities, but may fail at higher current densities. In general, an interconnect whose length is below the "Blech length" experiences a mechanical stress build-up that causes a reverse migration process that reduces or even compensates for material flow.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

DETAILED DESCRIPTION

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. As may be used herein, the term 'coupled' includes a direct electrical connection between elements or components and an indirect electrical connection between elements or components achieved using one or more intervening elements or components.

Using the "Blech length" to determine a length limit for an interconnect of an integrated circuit (IC) may result in over-design of IC interconnects. In general, the Blech length for an interconnect has been determined using ideal, straight-line, uniform width test structures. However, interconnect shapes typically found in ICs may have bends, turns, forks, and varying width, thus introducing substantial deviations from the ideal case. According to the present disclosure, techniques are disclosed that solve for stresses in IC interconnects that arise as a result of current flowing through the interconnects. The stresses are then compared to EM design rules to check for EM risk. In general, the techniques consider current direction to determine maximum stress in interconnect segments for EM checks. For example, maximum interconnect stress can be evaluated through inspection of an interconnect directed graph. According to various aspects, an interconnect directed graph is constructed following identification of current direction in all interconnect segments of a net. For example, current direction may be retrieved from a Spice simulation file. A maximum stress on an interconnect may then be calculated by comparing the maximum stress to a critical stress (e.g., determined by the Blech length and a maximum allowed current).

In general, the disclosed techniques are primarily targeted at verification and provide an exact solution to determine a critical stress that determines a critical length needed for applying the Blech effect, which is applicable to interconnect widths less than a certain width, e.g., about 3 microns. Accordingly, the disclosed techniques provide a straight-forward solution for determining a maximum stress of an arbitrary interconnect, which generally leads to a more accurate determination of EM risk and, in turn, higher quality products.

The Blech effect allows shorter interconnects to carry larger currents than longer interconnects. As one example, in a metal 1 (M1) layer for a 55 nanometer design, current densities based on length 'L' may be as follows: an interconnect with 'L' less than or equal to 5 um can carry 4 mA current density; an interconnect with 'L' greater than 5um and less than 20 um can carry 20/L mA current density; and an interconnect with 'L' greater than or equal to 20 um can carry 1 mA current density. In order to calculate current limits, 'L' must first be calculated. As alluded to above, conventional length calculation in CAD tools is pessimistic and can result in larger designs and IC quality issues. Conventionally, an accurate determination of current limits has required solving the full equations for stress/strain relation, mass conservation, and stress source from electron current. In general, solving the full equations is complex and time-consuming and, as such, the Blech length has traditionally been defined to be the maximum spanning length of all interconnect branches in a net. Thus, the Blech length is a conservative approximation for determining current limits of each interconnect segment.

Figure 1:
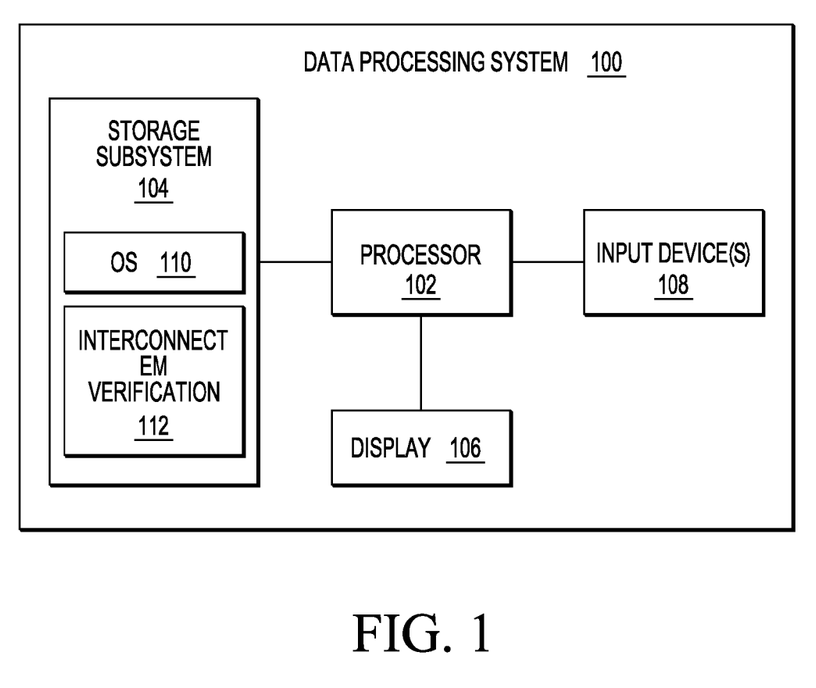
FIG. 1 is a diagram of a relevant portion of an exemplary data processing system that performs electromigration (EM) stress determination for interconnects of an integrated circuit (IC) design according to an embodiment of the present invention.

With reference to FIG. 1, an example data processing system 100 is illustrated that is configured to execute various electronic design automation (EDA) software. The system 100 may take various forms, such as one or more workstations, laptop computer systems, notebook computer systems, or desktop computer systems. The system 100 includes a processor 102 (which may include one or more processor cores for executing program code) coupled to a data storage subsystem 104, a display 106, and one or more input devices 108. The data storage subsystem 104 may include, for example, an application appropriate amount of volatile memory (e.g., dynamic random access memory (DRAM)), non-volatile memory (e.g., flash, read-only memory (ROM), or static RAM), and/or non-volatile mass storage devices, such as magnetic or optical disk drives. As is illustrated, the data storage subsystem 104 includes an operating system (OS) 110, as well as application programs, such as interconnect electromigration (EM) verification software 112. Display 106 may be, for example, a cathode ray tube (CRT) or a liquid crystal display (LCD) monitor. Input device(s) 108 may include, for example, a mouse, a keyboard, haptic devices, and/or a touch screen.

According to the present disclosure, current direction is utilized to determine maximum stress in interconnect segments for EM checks. According to one aspect of the present disclosure, a maximum stress is evaluated through inspection of an interconnect directed graph. According to this aspect, current direction is identified in all interconnect segments of a net and a directed graph is constructed. Maximum stress on an interconnect is then calculated. The maximum stress is then compared to a critical stress determined by the Blech length and the maximum allowed current.

Figure 2:
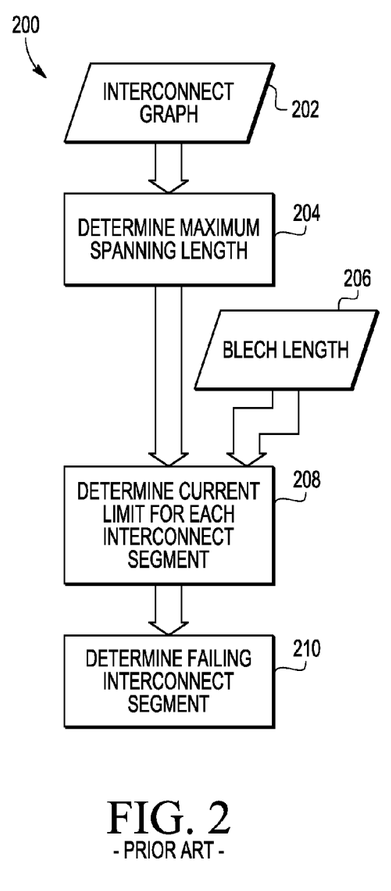
FIG. 2 is a diagram of a conventional approach for verifying that an integrated circuit design does not have EM problems based on the Blech length.

With reference to FIG. 2, a conventional process 200 for checking an integrated circuit (IC) design (or a portion of an IC design) is illustrated. As is shown in FIG. 2, a maximum spanning length 204 for an interconnect is determined from an interconnect graph 202. A Blech length 206, which is known for a given technology, is compared to the maximum spanning length 204. An appropriate current limit equation is then chosen based on the comparison. Current limits 208 for each interconnect segment are then determined. Finally, failing interconnect segments are determined 210, based on whether the maximum spanning length 204 is greater than the Blech length 206.

Figure 3:
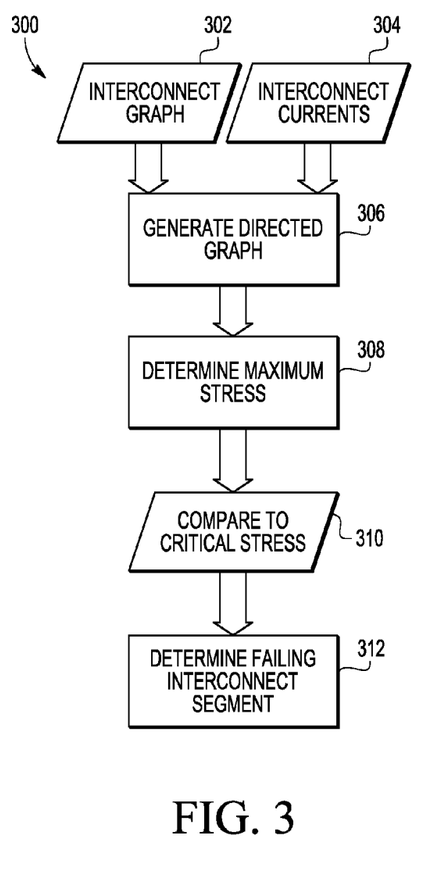
FIG. 3 is a diagram of a technique for verifying that an integrated circuit design does not have EM problems according to one or more embodiments of the present invention.

With reference to FIG. 3, a process 300, for determining stress in interconnects of an IC design according to the present disclosure, is illustrated. An interconnect graph 302 and interconnect currents 304 are utilized to generate a directed graph 306. For example, a direction of the interconnect currents 304 may be retrieved from a Spice file. A maximum stress 308 for the directed graph 306 is then determined, as is discussed in further detail below. The maximum stress 308 is then compared to a critical stress 310. Finally, a determination is made as to whether the directed graph 306 has a failing interconnect segment 312.

Figure 4:
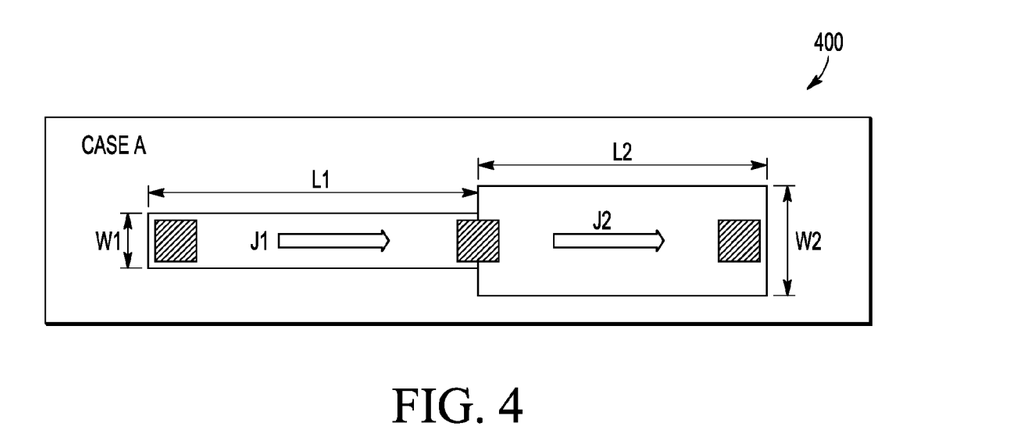
FIG. 4 is a diagram of a typical interconnect carrying currents (represented by current densities J1 and J2) in a same direction.
Figure 5:
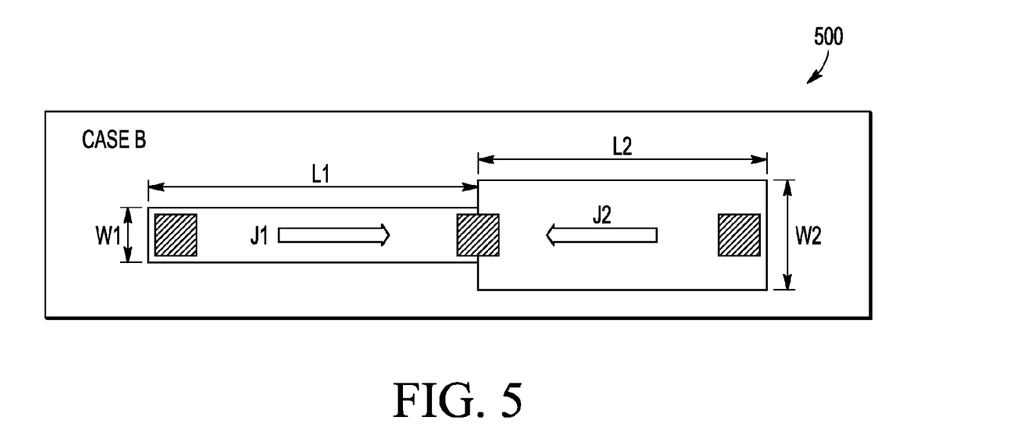
FIG. 5 is a diagram of a typical interconnect with currents (represented by current densities J1 and J2) in opposite directions.

With reference to FIGS. 4 and 5, using the conventional approaches, a Blech length for interconnect 400 (labeled 'Case A') and interconnect 500 (labeled 'Case B') has been defined as L=L1+L2, even though a current (represented by current density J2) flows through the interconnects 400 and 500 in opposite directions. According to the present disclosure, fundamental equations for stress caused by electron current density J, stress-strain relation, and mass conservation at each node 'i' of an interconnect are utilized to determine interconnect stress. In general, stress is confined to a given metal layer due to metal barriers. Stress caused by electron current density 'J' may be represented by:

$$\frac{\partial \sigma}{\partial x} = cj$$

where 'c' is a material-dependent constant given by:

$$c = \frac{Z^* e \rho}{\Omega}$$

where 'Z*' is the effective electron density, 'e' is the electron charge, 'ρ' is the resistivity, and 'Ω' is the effective atomic volume. The displacement (stress-strain relation) is given by:

$$\frac{\partial u}{\partial x} = \frac{1}{M}\sigma$$

where 'M' is Young's modulus and 'u' is the strain. Mass conservation at each node 'i' is given by:

$$\sum_{e \in \{j\}} u_{ije} w_e$$

where $u_{ije}$ is the displacement at the 'jth' node on a segment 'e' between nodes 'i' and 'j' and $w_e$ is the width of segment 'e'.

Figure 6:
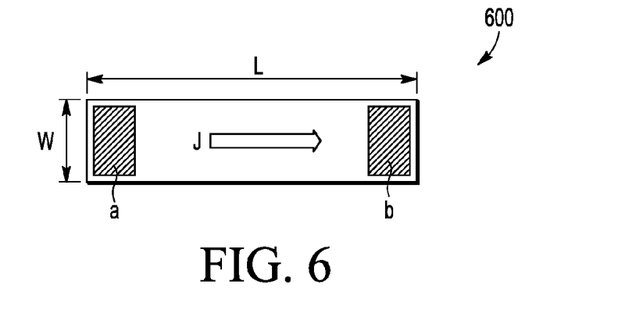
FIG. 6 is a diagram of a typical interconnect test structure utilized to determine critical stress and whether an interconnect will exhibit EM problems according to one or more aspects of the present invention.

With reference to FIG. 6, a typical test structure 600 that may be utilized for determining critical stress is illustrated. Stress at nodes 'a' and 'b' may be given by:

$$\sigma_a = -\frac{c}{2} J \times L \rightarrow \sigma_a = -\frac{c}{2} \frac{v \times a}{a} \quad a = W \times L$$

$$\sigma_b = +\frac{c}{2} J \times L \rightarrow \sigma_b = +\frac{c}{2} \frac{v \times a}{a} \quad v = J \times L$$

where 'v' is proportional to the potential and 'α' is the area. If the stress at a node 'a' is greater than the critical strength of the interconnect, then a failure will occur (i.e., if $\sigma_a > \sigma^*$, a failure will occur).

Figure 7:
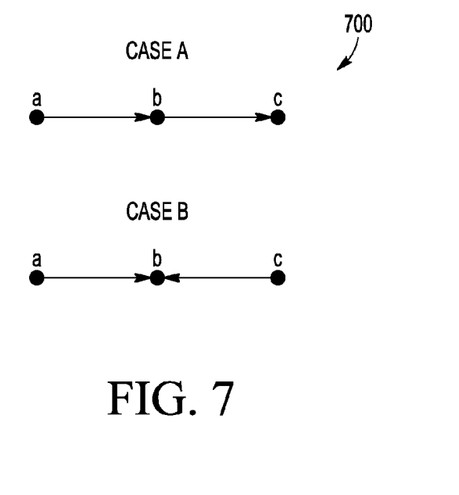
FIG. 7 is a diagram illustrating directed graphs for an exemplary IC interconnect with currents in a same direction in Case A and in opposite directions in Case B.

With reference to FIG. 7 directed graphs 700 (labeled 'Case A' and 'Case B') illustrate current flowing through an interconnect including nodes 'a', 'b', and 'c'. In Case A, current flows from node 'a' to node 'b' and from node 'b' to node 'c'. In contrast, in Case B, current flows from node 'a' to node 'b' and from node 'c' to node 'b'. Equations for the stress at nodes 'a', 'b', and 'c' for Case A and Case B are set forth below:

$$\sigma_{Aa} = -\frac{c}{2} \frac{v_1 a_1 + v_2 a_2 + 2 v_1 a_2}{a_1 + a_2}$$

$$\sigma_{Ba} = -\frac{c}{2} \frac{v_1 a_1 + v_2 a_2 + 2 v_1 a_2}{a_1 + a_2}$$

$$\sigma_{Ab} = \frac{c}{2} \frac{v_1 a_1 - v_2 a_2}{a_1 + a_2}$$

$$\sigma_{Bb} = \frac{c}{2} \frac{v_1 a_1 + v_2 a_2}{a_1 + a_2}$$

$$\sigma_{Ac} = +\frac{c}{2} \frac{v_1 a_1 + v_2 a_2 + 2 v_2 a_1}{a_1 + a_2}$$

$$\sigma_{Bc} = +\frac{c}{2} \frac{v_1 a_1 + v_2 a_2 - 2 v_2 a_1}{a_1 + a_2}$$

From the above equations, it should be appreciated that the following two inequalities always hold:

$$|\sigma_{Aa}| \geq |\sigma_{Ba}|$$

$$|\sigma_{Aa}| \geq |\sigma_{Bc}|$$

As such, Case B will always have less tensile stress than Case A and, consequently, less EM risk.

Figure 8:
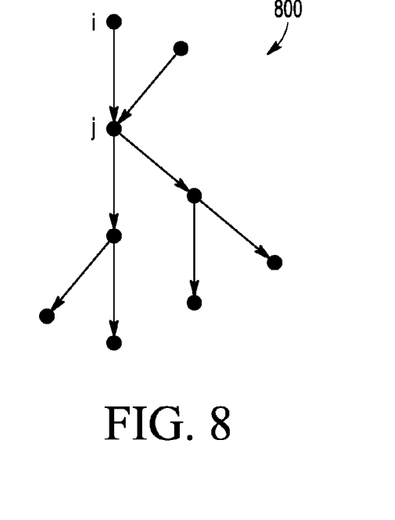
FIG. 8 is a diagram illustrating an exemplary directed graph for an exemplary IC interconnect.

With reference to FIG. 8, it should be appreciated that any interconnect network 800 of an IC can be represented by a directed graph 'G', with each edge of the graph 'G' having a weight c*J*L and a direction that is the same as the current. The stress differential from node 'i' to node 'j' may be represented by the following equations:

$$\Delta \sigma_{ij} = c \times J_{ij} \times L_{ij} \rightarrow \Delta \sigma_{ij} = \frac{c}{R_{sh}} \times I_{ij} \times R_{ij} \rightarrow \Delta \sigma_{ij} = \frac{c}{R_{sh}} \times \Delta V_{ij}$$

where 'c' is a material-dependent constant, $J_{ij}$ is the current density from node 'i' to node 'j', $L_{ij}$ is the physical length from node 'i' to node 'j', $R_{sh}$ is the sheet resistance, $I_{ij}$ is the current from node 'i' to node 'I, $R_{ij}$ is the resistance from node 'i' to node 'j', and $V_{ij}$ is the potential from node 'i' to node 'j'. As stress differential is proportional to potential difference, maximum stress occurs at the highest potential on the interconnect.

The stress at any node j ($\sigma_j$) may be given by:

$$\sigma_j = -\frac{c}{2} \times \frac{\sum_{i=1}^{N} \left( a_{T_i} \times \sum_{k \in P_{i,j}} (J_{k,k+1} \times L_{k,k+1}) \right)}{A}$$

where 'N' is the total number of nodes in 'G' and $P_{ij}$ is the path from node 'i' to node 'j'. The stress at any node 'j' written in terms of potential difference between 'i' and 'j' may be given by:

$$\sigma_j = -\frac{c}{2 R_{sh}} \times \frac{\sum_{\substack{i=1 \\ i \neq j}}^{N} (a_{T_i} \times \Delta V_{ij})}{A}$$

where 'A' is the area. The partial interconnect area at node 'i' may be given by:

$$a_{T_i} = \sum_{n \in \{N_i\}} a_n$$

where 'n' is the branch index connected to node 'i'. The total interconnect area may be given by:

$$A = \sum_{n \in \{G\}} a_n$$

where 'n' is the branch index over the whole of the graph 'G'. From the above, it follows that:

$$\sum_{\substack{i=1 \\ i \neq j}}^{N} a_{T_i} = 2A - a_{T_j} < 2A$$

Assuming all nodes are at the lowest potential (except the highest node) yields an upper limit of maximum tensile stress of:

$$\sigma_{in,ul} = -\frac{c}{2 R_{sh}} \times \Delta V_{max} \times \frac{\sum_{i=1}^{N} a_{T_i}}{A} > -\frac{c \times \Delta V_{max}}{R_{sh}}$$

$$\lambda = \frac{\sigma_{m,ul}}{\sigma^*} = \frac{2 \times \Delta V_{max}}{R_{sh} \times J^* \times L^*}$$

According to one aspect of the present disclosure, an interconnect solution can be found as follows: find a maximal spanning tree 'T' of 'G'; find the highest stress 'H' and lowest stress 'L' on 'T' (stress is lowest (tensile) at highest potential at 'L' and stress is highest (compressive) at lowest potential at 'H'); find any path P between 'H' and 'L'; calculate λ; if λ<1 then exit; otherwise calculate β; if β<1 then exit; if β>1, show an error on edge connected to the node and repeat for the next node in lower potential. In this case the stress is given by:

$$\sigma_L = \sigma_H - c \times \sum_{a \in P} J_a \times L_a$$

λ is given by:

$$\lambda = -\frac{2 \times \Delta V_{max}}{R_{sh} \times J^* \times L^*}$$

and β is given by:

$$\beta_j = \frac{\sum_{i=1}^{N}(a_{T_i} \times \Delta V_{ij})}{R_{sh} \times J^* \times L^* \times A}$$

Figure 9:
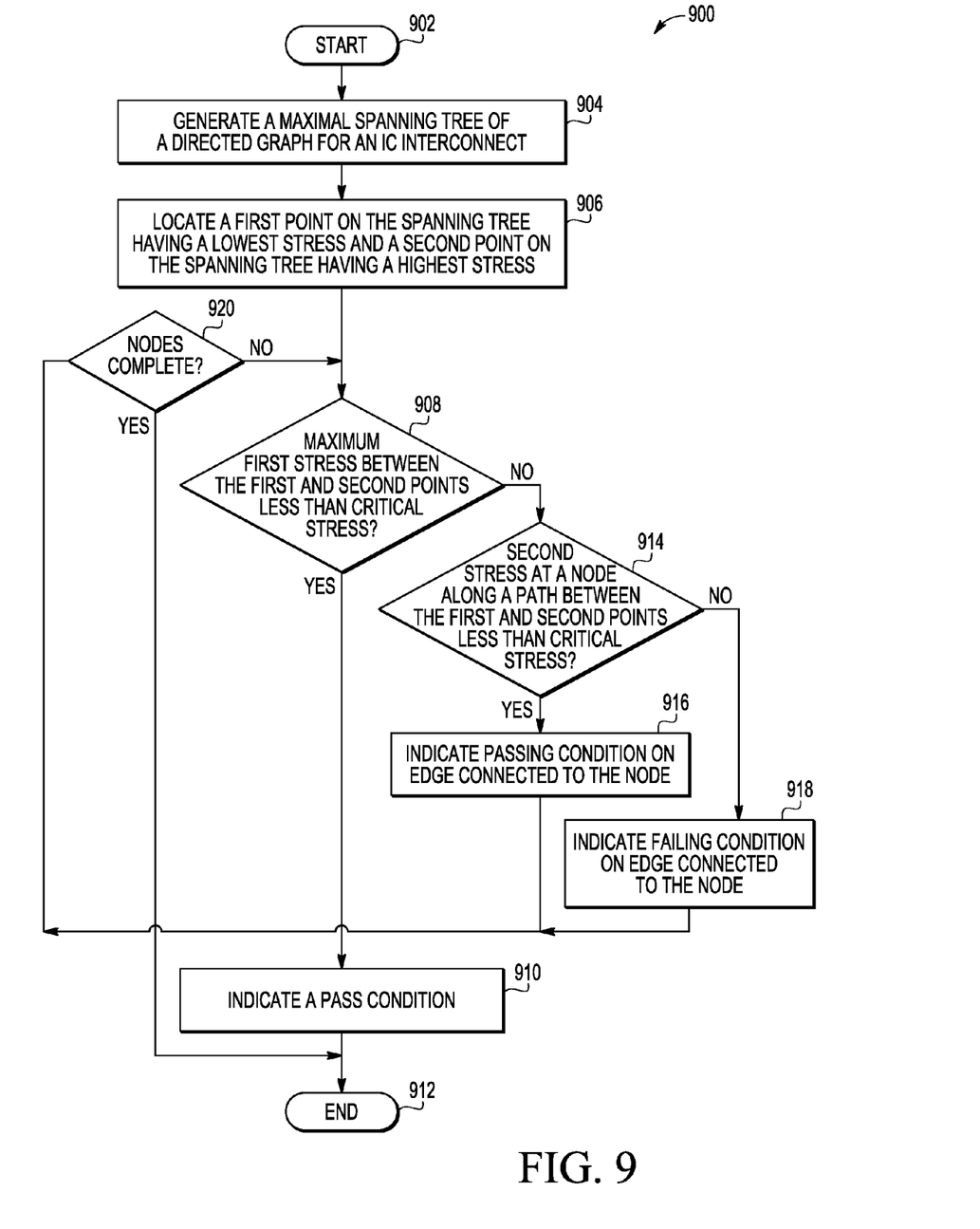
FIG. 9 is a flowchart for an exemplary process that determines whether an EM problem exists for an IC interconnect that is represented as a directed graph according to an embodiment of the present invention.

With reference to FIG. 9, a process 900 is illustrated that determines stress in interconnects of an integrated circuit (IC) design. The process 900 may be implemented by data processing system 100 executing interconnect EM verification software 112 (see FIG. 1) that employs one or more of the equations disclosed above. The process 900 is initiated in block 902, at which point control transfers to block 904. In block 904, the system 100 generates a maximal spanning tree 'T' of a directed graph 'G' that represents an interconnect of interest in an IC design. Next, in block 906, the system 100 locates a first point on the spanning tree that has a lowest stress and a second point on the spanning tree that has a highest stress. Then, in decision block 908, the system 100 determines whether a maximum first stress between the first and second points is less than a critical stress. In response to the maximum first stress being less than the critical stress in block 908, control transfers to block 910 where the system 100 indicates a pass condition in response to the maximum first stress being less than the critical stress. Following block 910, the process 900 terminates in block 912, at which point control returns to a calling routine.

In response to the maximum first stress being greater than or equal to the critical stress in block 908, control transfers to decision block 914. In block 914, the data processing system 100 determines whether a second stress at a node along a path between the first and second points is less than the critical stress. In response to the second stress at the node along the path between the first and second points being less than the critical stress control transfers from block 914 to block 916. In block 916, the data processing system 100 indicates a pass condition on an edge connected to the node. Following block 916, control transfers to decision block 920, where the data processing system 100 determines if another node exists between the first and second points.

If another node exists in block 920, control transfers to block 908. If another node does not exist in block 920, control transfers to block 912. In response to the second stress at the node along the path between the first and second points being greater than or equal to the critical stress in block 914, control transfers to block 918. In block 918, the data processing system 100 indicates a failing condition on the edge connected to the node. Following block 918, control transfers to block 920.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in various embodiments of the present invention may be implemented using any combination of software, firmware or hardware. As a preparatory step to practicing the invention in software, code (whether software or firmware) according to a preferred embodiment will typically be stored in one or more machine readable storage mediums such as semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a random access memory (RAM), etc. An apparatus for practicing the techniques of the present disclosure could be one or more communication devices.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of determining stress in interconnects of an integrated circuit design, comprising:
    generating, using a data processing system, a maximal spanning tree of a directed graph, wherein the directed graph represents an interconnect network of an integrated circuit design;
    locating, using the data processing system, a first point on the spanning tree having a lowest stress and a second point on the spanning tree having a highest stress; and
    determining, using the data processing system, whether a maximum first stress between the first and second points is less than a critical stress.

2. The method of claim 1, further comprising:
    indicating, using the data processing system, a pass condition in response to the maximum first stress being less than the critical stress, wherein the maximum first stress is given by:

$$\Delta\sigma_{ij} = \frac{c}{R_{sh}} \times \Delta V_{ij}$$

where 'c' is a material-dependent constant, $R_{sh}$ is the sheet resistance, and $\Delta V_{ij}$ is the potential from node 'i 'to node 'j'.

3. The method of claim 1, further comprising:
determining, using the data processing system, whether a second stress at a node along a path between the first and second points is less than the critical stress in response to the maximum first stress being greater than or equal to the critical stress; and
indicating, using the data processing system, in response to the second stress at the node along the path between the first and second points being less than the critical stress, a passing condition on an edge connected to the node.

4. The method of claim 1, further comprising:
determining, using the data processing system, whether a second stress at a node along a path between the first and second points is less than the critical stress in response to the maximum first stress being greater than or equal to the critical stress; and
indicating, using the data processing system, in response to the second stress at the node along the path between the first and second points being greater than or equal to the critical stress, a failing condition on an edge connected to the node.

5. The method of claim 1, wherein the lowest stress occurs at a highest potential.

6. The method of claim 1, wherein the highest stress occurs at a lowest potential.

7. The method of claim 3, wherein the second stress at node 'j' is given by:

$$\sigma_j = -\frac{c}{2R_{sh}} \times \frac{\sum_{\substack{i=1 \\ i \neq j}}^{N} (a_{T_i} \times \Delta V_{ij})}{A}$$

where 'A' is the total area of the interconnect, $R_{sh}$ is the sheet resistance, 'c' a material-dependent constant, $\alpha_{Ti}$ a partial interconnect area at node 'i', $\Delta V_{ij}$ is the potential difference between node 'i' and node 'j'; and 'N' is the total number of nodes in the directed graph.

8. A data processing system for determining stress in interconnects of an integrated circuit design, the data processing system comprising:
a storage subsystem; and
a processor coupled to the storage subsystem, wherein the processor is configured to generate a maximal spanning tree of a directed graph that represents an interconnect of an integrated circuit design, locate a first point on the spanning tree having a lowest stress and a second point on the spanning tree having a highest stress, and determine whether a maximum first stress between the first and second points is less than a critical stress.

9. The data processing system of claim 8, wherein the processor is further configured to indicate a pass condition in response to the maximum first stress being less than the critical stress, and wherein the maximum first stress is given by:

$$\Delta\sigma_{ij} = \frac{c}{R_{sh}} \times \Delta V_{ij}$$

where 'c' is a material-dependent constant, $R_{sh}$ is the sheet resistance, and $\Delta V_{ij}$ is the potential from node 'i 'to node 'j'.

10. The data processing system of claim 8, wherein the processor is further configured to determine whether a second stress at a node along a path between the first and second points is less than the critical stress, in response to the maximum first stress being greater than or equal to the critical stress, and indicate, in response to the second stress at the node along the path between the first and second points being less than the critical stress, a passing condition on an edge connected to the node.

11. The data processing system of claim 8, wherein the processor is further configured to determine whether a second stress at a node along a path between the first and second points is less than the critical stress, in response to the maximum first stress being greater than or equal to the critical stress, and indicate, in response to the second stress at the node along the path between the first and second points being greater than or equal to the critical stress, a failing condition on an edge connected to the node.

12. The data processing system of claim 8, wherein the lowest stress occurs at a highest potential.

13. The data processing system of claim 8, wherein the highest stress occurs at a lowest potential.

14. The data processing system of claim 10, wherein the second stress at node 'j' is given by:

$$\sigma_j = -\frac{c}{2R_{sh}} \times \frac{\sum_{\substack{i=1 \\ i \neq j}}^{N} (a_{T_i} \times \Delta V_{ij})}{A}$$

where 'A' is the total area of the interconnect, $R_{sh}$ is the sheet resistance, 'c' a material dependent constant, $\alpha_{Ti}$ a partial interconnect area at node 'i', $\Delta V_{ij}$ is the potential difference between node 'i' and node 'j'; and 'N' is the total number of nodes in the directed graph.

15. A method of determining stress in interconnects of an integrated circuit design, comprising:
generating, using a data processing system, a maximal spanning tree of a directed graph, wherein the directed graph represents an interconnect network of an integrated circuit design;
locating, using the data processing system, a first point on the spanning tree having a lowest stress and a second point on the spanning tree having a highest stress;
determining, using the data processing system, whether a maximum first stress between the first and second points is less than a critical stress;
indicating, using the data processing system, a pass condition in response to the maximum first stress being less than the critical stress, wherein the maximum first stress is given by:

$$\Delta\sigma_{ij} = \frac{c}{R_{sh}} \times \Delta V_{ij}$$

where 'c' is a material-dependent constant, $R_{sh}$ is the sheet resistance, and $\Delta V_{ij}$ is the potential from node 'i' to node 'j', and wherein the lowest stress occurs at a highest potential and the highest stress occurs at a lowest potential.

16. The method of claim 15, further comprising:

determining, using the data processing system, whether a second stress at a node along a path between the first and second points is less than the critical stress in response to the maximum first stress being greater than or equal to the critical stress; and indicating, using the data processing system, in response to the second stress at the node along the path between the first and second points being less than the critical stress, a passing condition on an edge connected to the node.

17. The method of claim 16, wherein the second stress at node 'j' is given by:

$$\sigma_j = -\frac{c}{2R_{sh}} \times \frac{\sum_{\substack{i=1 \\ i \neq j}}^{N}(a_{T_i} \times \Delta V_{ij})}{A}$$

where 'A' is the total area of the interconnect, $R_{sh}$ is the sheet resistance, 'c' a material-dependent constant, $\alpha_{T_i}$ a partial interconnect area at node 'i', $\Delta V_{ij}$ is the potential difference between node 'i' and node 'j'; and 'N' is the total number of nodes in the directed graph.

18. The method of claim 15, further comprising:

determining, using the data processing system, whether a second stress at a node along a path between the first and second points is less than the critical stress in response to the maximum first stress being greater than or equal to the critical stress; and indicating, using the data processing system, in response to the second stress at the node along the path between the first and second points being greater than or equal to the critical stress, a failing condition on an edge connected to the node.

19. The method of claim 18, wherein the second stress at node 'j' is given by:

$$\sigma_j = -\frac{c}{2R_{sh}} \times \frac{\sum_{\substack{i=1 \\ i \neq j}}^{N}(a_{T_i} \times \Delta V_{ij})}{A}$$

where 'A' is the total area of the interconnect, $R_{sh}$ is the sheet resistance, 'c' a material-dependent constant, $\alpha_{T_i}$, a partial interconnect area at node 'i', $\Delta V_{ij}$ is the potential difference between node 'i' and node 'j'; and 'N' is the total number of nodes in the directed graph.

20. The method of claim 15, further comprising:

determining, using the data processing system, whether a second stress at a node along a path between the first and second points is less than the critical stress in response to the maximum first stress being greater than or equal to the critical stress;

indicating, using the data processing system, in response to the second stress at the node along the path between the first and second points being less than the critical stress, a passing condition on an edge connected to the node; and indicating, using the data processing system, in response to the second stress at the node along the path between the first and second points being greater than or equal to the critical stress, a failing condition on an edge connected to the node.

* * * * *